United States Patent
Lee et al.

(10) Patent No.: US 11,845,461 B2
(45) Date of Patent: Dec. 19, 2023

(54) THERMAL MONITORING SYSTEM FOR TRAILER WHEEL AREA

(71) Applicant: Hyundai Translead, San Diego, CA (US)

(72) Inventors: Jong Seog Lee, Chula Vista, CA (US); James Sangyoung Oh, Irvine, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 17 days.

(21) Appl. No.: 17/383,244

(22) Filed: Jul. 22, 2021

(65) Prior Publication Data

US 2022/0024477 A1 Jan. 27, 2022

Related U.S. Application Data (60) Provisional application No. 63/055,131, filed on Jul. 22, 2020.

(51) Int. Cl.
*B60W 50/14* (2020.01)
*H04W 4/48* (2018.01)
*B62D 63/08* (2006.01)

(52) U.S. Cl.
CPC ............ *B60W 50/14* (2013.01); *B62D 63/08* (2013.01); *H04W 4/48* (2018.02); *B60W 2050/146* (2013.01)

(58) Field of Classification Search
None
See application file for complete search history.

(56) References Cited

U.S. PATENT DOCUMENTS

| | | | | |
|---|---|---|---|---|
| 5,825,286 A | * | 10/1998 | Coulthard | G07C 5/008 340/447 |
| 6,680,672 B2 | * | 1/2004 | Borugian | F16D 66/021 73/115.07 |
| 6,892,778 B2 | * | 5/2005 | Hennig | B60C 23/02 301/124.1 |
| 9,947,151 B2 | * | 4/2018 | Ellis | B60C 5/005 |
| 10,186,091 B2 | * | 1/2019 | Ellis | G07C 5/0825 |
| 10,841,127 B1 | * | 11/2020 | Greer | H04W 4/46 |
| 11,302,120 B2 | * | 4/2022 | Hößle | G07C 5/0816 |
| 11,383,689 B2 | * | 7/2022 | Engelbert | B60T 17/22 |
| 2002/0104717 A1 | * | 8/2002 | Borugian | F16D 66/021 188/1.11 E |

(Continued)

FOREIGN PATENT DOCUMENTS

| | | | | |
|---|---|---|---|---|
| CA | 3039675 A1 | * | 4/2018 | ............ B62D 63/08 |
| CA | 3044009 A1 | * | 11/2019 | ............ B60C 23/20 |

(Continued)

*Primary Examiner* — Kevin R Steckbauer
(74) *Attorney, Agent, or Firm* — Procopio, Cory, Hargreaves & Savitch LLP (57) ABSTRACT

Monitoring critical areas of a trailer for thermal events, including: a plurality of sensors placed at or near the critical areas of the trailer, the plurality of sensors to sense the thermal events at the critical areas as sensor data, wherein the critical areas include at least tire, brake, and wheel end; a main controller to receive and monitor the sensor data measured by the plurality of sensors, the main controller to trigger at least one of alerts and warnings; an indicator light to activate the alerts; and an alarm to sound the warnings.

4 Claims, 6 Drawing Sheets

(56) References Cited

U.S. PATENT DOCUMENTS

| | | | | |
|---|---|---|---|---|
| 2002/0130771 A1* | 9/2002 | Osborne | ............... | B60C 23/008 |
| | | | | 340/441 |
| 2005/0052074 A1* | 3/2005 | Hennig | .................... | B61K 9/04 |
| | | | | 301/124.1 |
| 2017/0206720 A1* | 7/2017 | Ellis | ........................ | B60B 3/165 |
| 2018/0232966 A1* | 8/2018 | Ellis | ........................ | G07C 5/006 |
| 2019/0359196 A1* | 11/2019 | Engelbert | ............... | B60T 17/22 |
| 2020/0366520 A1* | 11/2020 | Greer | ........................ | B60T 7/20 |
| 2022/0024477 A1* | 1/2022 | Lee | ........................ | H04W 4/48 |
| 2022/0036664 A1* | 2/2022 | Jankowski | ............ | B60C 23/001 |
| 2022/0221016 A1* | 7/2022 | Sienkiewicz | ......... | H04W 12/63 |
| 2022/0225064 A1* | 7/2022 | Greer | .................... | F16D 66/027 |
| 2022/0415100 A1* | 12/2022 | Hartmann | ............ | G07C 5/0816 |

FOREIGN PATENT DOCUMENTS

| | | | | | |
|---|---|---|---|---|---|
| CA | 3125657 A1 | * | 1/2022 | ............ | B60W 50/14 |
| CN | 106314414 A | * | 1/2017 | | |
| CN | 207649913 U | * | 7/2018 | | |
| CN | 109591522 A | * | 4/2019 | ............ | B60C 23/00 |
| CN | 109591522 B | * | 12/2020 | ............ | B60C 23/00 |
| DE | 102019133172 A1 | * | 6/2021 | ............ | G07C 5/008 |
| WO | WO-2020236392 A1 | * | 11/2020 | ............... | B60Q 9/00 |

\* cited by examiner

THERMAL MONITORING SYSTEM FOR TRAILER WHEEL AREA

CROSS-REFERENCE TO RELATED APPLICATIONS

This application claims the benefit of priority under 35 U.S.C. § 119(e) of U.S. Provisional Patent Application No. 63/055,131, filed Jul. 22, 2020, entitled "Thermal Monitoring System for Trailer Wheel Area." The disclosure of the above-referenced application is incorporated herein by reference.

BACKGROUND

Field of the Invention

The present disclosure relates generally to trailers, and more specifically, to thermal monitoring of the trailer wheel area.

Background

During the operation of a trailer, thermal events such as fire can occur in the wheel area due to several different causes. For example, brake dragging may cause overheating at the brake pad and/or brake drum. In another example, less than normal amount of lubricant (e.g., oil or grease) may cause overheating in the drum. In another example, use of wrong air valves may cause tire and/or brake dragging. In another example, excessive or low tire pressure may cause overheating of tires and/or wheels. Normal operating temperatures for tires and wheels are between 100 and 150° F. Temperatures between 200 and 300° F. may impact other vehicle components, temperatures between 500 and 550° F. may cause flammable vapors to start to form, and temperatures between 650 and 700° F. may cause burning fires that are difficult to extinguish).

In many cases, the impact of the thermal event may result in a total destruction of the trailer, and the trailer may be burnt too badly to determine the root cause of the event. The thermal event may also cause an accident and pose a danger to the driver and to the passengers of the other vehicles. Further, the thermal event may result in a large financial burden to the owner of the trailer.

SUMMARY

The present disclosure describes thermal monitoring of a wheel area of a trailer.

In one implementation, a system to monitor critical areas of a trailer for thermal events is disclosed. The system includes: a plurality of sensors placed at or near the critical areas of the trailer, the plurality of sensors to sense the thermal events at the critical areas as sensor data, wherein the critical areas include at least tire, brake, and wheel end; a main controller to receive and monitor the sensor data measured by the plurality of sensors, the main controller to trigger at least one of alerts and warnings; an indicator light to activate the alerts; and an alarm to sound the warnings.

In one implementation, the thermal events include temperature changes. In one implementation, the main controller triggers the at least one of alerts and warnings when the monitored sensor data detects the temperature changes above pre-defined thresholds. In one implementation, the main controller also displays a status of the plurality of sensors on a display. In one implementation, main controller also sends the sensor data to a headquarter using a telematics device. In one implementation, the main controller also sends the at least one of alerts and warnings to the headquarter. In one implementation, the system further includes a wireless communication device for transmitting and receiving data between the plurality of sensors and the main controller. In one implementation, the plurality of sensors includes a brake temperature sensor, a tire pressure monitoring sensor, a wheel end sensor, and an air brake chamber sensor.

In another implementation, a method for monitoring critical areas of a trailer for thermal events is disclosed. The method includes: receiving sensor data measured by a plurality of sensors located at the critical areas of the trailer including at least tire, brake, and wheel end; monitoring the sensor data for temperature changes; triggering alerts and warnings when the temperature changes are detected to be above pre-defined thresholds; turning on indicator lights and alarm sounds to a driver; and transmitting the sensor data and the alerts and warnings to a headquarter.

In one implementation, the sensor data is received from the plurality of sensors via wireless communication. In one implementation, the method further includes displaying a status of the plurality of sensors on a display. In one implementation, the plurality of sensors includes a brake temperature sensor, a tire pressure monitoring sensor, a wheel end sensor, and an air brake chamber sensor.

In another implementation, a non-transitory computer-readable storage medium storing a computer program to monitor critical areas of a trailer for thermal events is disclosed. The computer program includes executable instructions that cause a computer to: receive sensor data measured by a plurality of sensors located at the critical areas of the trailer including at least tire, brake, and wheel end; monitor the sensor data for temperature changes; trigger alerts and warnings when the temperature changes are detected to be above pre-defined thresholds; turn on indicator lights and alarm sounds to a driver; and transmit the sensor data and the alerts and warnings to a headquarter.

In one implementation, the sensor data is received from the plurality of sensors via wireless communication. In one implementation, the computer program further includes executable instructions that cause the computer to display a status of the plurality of sensors on a display.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

Figure 1A:
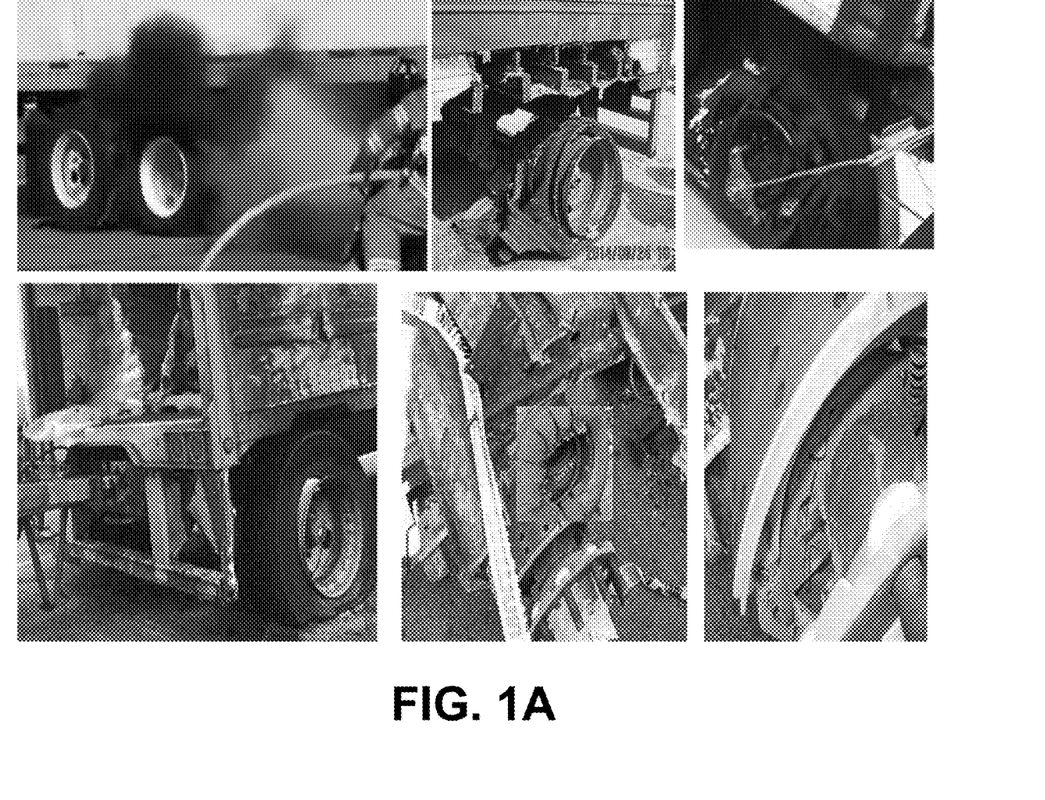
FIG. 1A shows pictures of damages to the tire, wheel end, and/or brake area caused by the thermal events.

Thermal events in the tire, wheel end, and/or brake area can generate severe overheating and may lead to a fire that can cause accident or destruction of the trailer and pose a danger to the driver and to the passengers of the other vehicles. FIG. 1A shows pictures of damages to the tire, wheel end, and/or brake area caused by the thermal events.

Figure 1B:
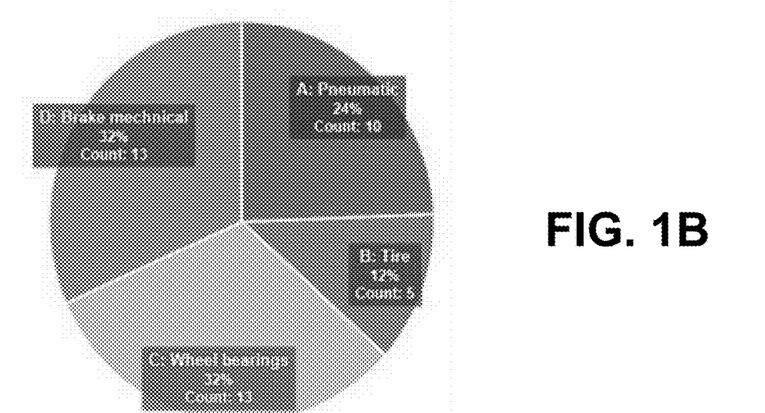
FIG. 1B shows statistics for the thermal event caused by different failures.

As described above, the thermal events may be caused by several different failures including: brake dragging which may cause overheating at the brake pad and/or brake drum; less than normal amount of lubricant (e.g., oil or grease) which may cause overheating in the drum; use of wrong air valves which may cause tire and/or brake dragging; and excessive or low tire pressure which may cause overheating of tires and/or wheels. FIG. 1B shows statistics for the thermal event caused by different failures. For example, the statistics show that: 24% of the thermal event is caused by the pneumatic failure, 12% of the thermal event is caused by the tire failure, 32% of the thermal event is caused by the wheel bearing failure, and 32% of the thermal event is caused by the brake mechanical failure. Current solutions to address the causes of the thermal events include regular maintenance inspection check and scheduled replacement of certain components. However, these solutions do not provide active warning or monitoring, and thus, may be inadequate to provide protection from the thermal events.

Therefore, to address the issues involved with the thermal events, certain implementations of the present disclosure provide for system and method to monitor critical areas for possible excessive heating, to alert the driver, to inform the fleet headquarter of the failures, and to take any necessary actions to limit the damage to the trailer. Accordingly, after reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

Figure 2A:
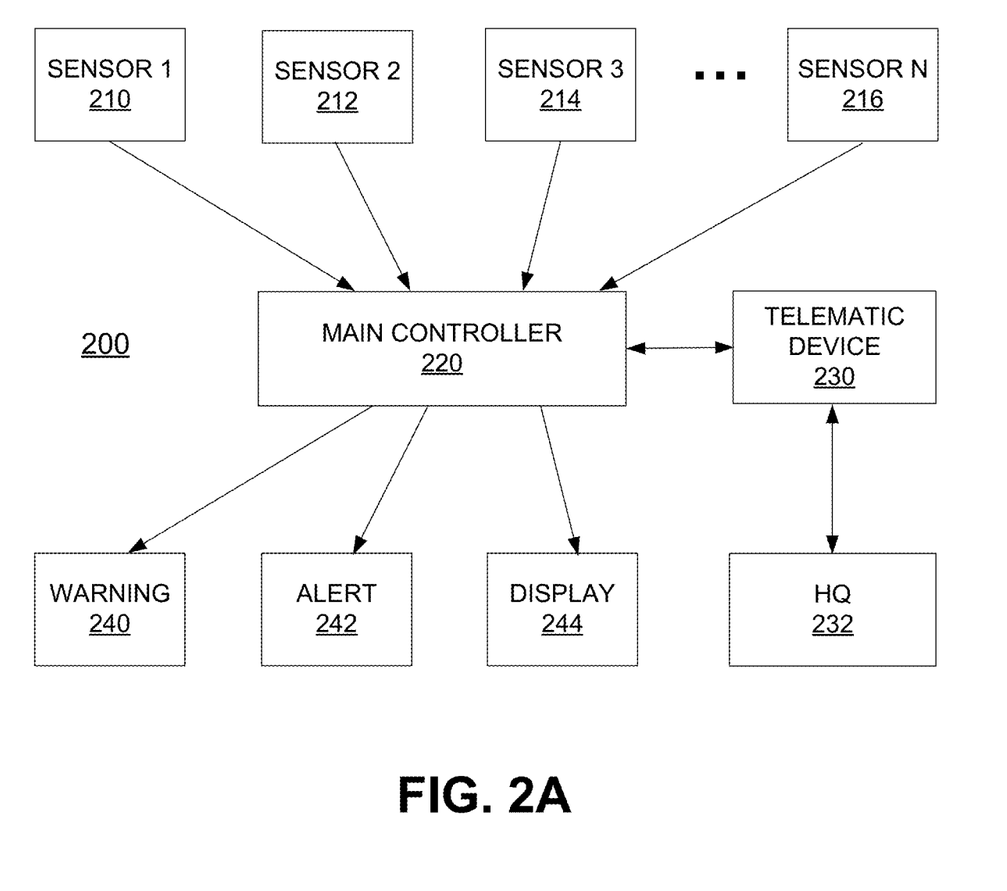
FIG. 2A is a block diagram of a system to monitor critical areas of a trailer for thermal events in accordance with one implementation of the present disclosure.

FIG. 2A is a block diagram of a system 200 to monitor critical areas of a trailer for thermal events in accordance with one implementation of the present disclosure. The system 200 is configured to monitor the critical areas for possible excessive heating, to alert the driver, to inform the fleet headquarter of the failures, and to take any necessary actions to limit the damage to the trailer. In one implementation, the system 200 is configured to recognize the fact that the cause of failures is independent to each area, but the result is correlated. That is, the heat generated from each area can quickly transfer over to other areas nearby and lead to thermal events.

In the illustrated implementation of FIG. 2A, the system 200 includes a plurality of sensors 210, 212, 214, 216 placed at or near the critical areas, a main controller 220, a telematic device 230 to communicate the failures to the fleet headquarter 232, and a warning device 240, an alert device 242, and a display 244 to alert the driver.

In the illustrated implementation of FIG. 2A, the plurality of sensors 210, 212, 214, 216 measure temperature changes in critical areas including but not limited to tire, brake, and/or wheel end. The sensors 210, 212, 214, 216 then transmit the measured sensor data to the main controller 220 via wire or wireless communication.

In the illustrated implementation of FIG. 2A, the main controller 220 monitors incoming sensor data from the sensors 210, 212, 214, 216 and triggers alerts 242 and/or warnings 240. In one implementation, the main controller 220 turns on indicator light and/or alarm sound to the driver when the temperature changes are detected to be above pre-defined thresholds. In another implementation, the main controller 220 also displays the status on the display 244. In a further implementation, the main controller 220 sends the sensor data and the alerts and/or warnings to the headquarter 232 using the telematics device 230.

Figure 2B:
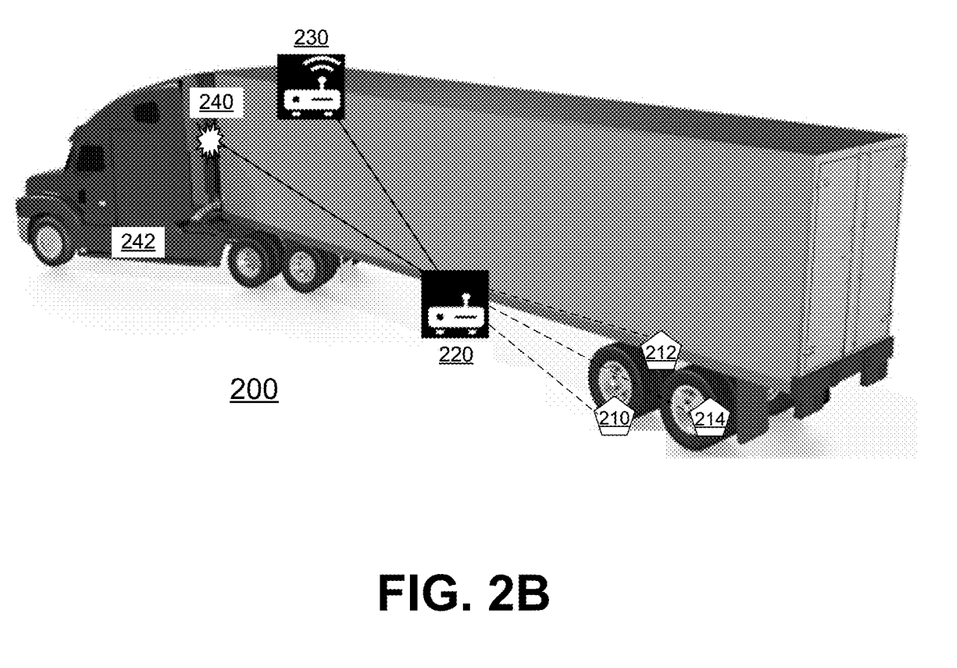
FIG. 2B shows components of the system which are installed in the trailer in accordance with one implementation of the present disclosure.

FIG. 2B shows components of the system 200 which are installed in the trailer in accordance with one implementation of the present disclosure. FIG. 2B shows sensors 210, 212, 214 installed to measure temperature changes in critical areas including the tire 212, the brake 210, and the wheel end 214. Although FIG. 2B only shows the sensors installed on the tire 212, the brake 210, and the wheel end 214, other sensors may be installed in other critical areas such as wheel axles. In FIG. 2B, the sensors 210, 212, 214 then transmit the measured sensor data to the main controller 220 via wire or wireless communication. In one implementation, the main controller 220 is located in the trailer. In another implementation, the main controller 220 is located in the cab 242.

In FIG. 2B, the main controller 220 monitors incoming sensor data from the sensors 210, 212, 214 and triggers alerts and/or warnings 240. In one implementation, the main controller 220 turns on indicator light and/or alarm sound to the driver when the temperature changes are detected to be above pre-defined thresholds. In another implementation, the main controller 220 also displays the status on the display. In a further implementation, the main controller 220 sends the sensor data and the alerts and/or warnings to the headquarter using the telematics device 230. In one implementation, the telematics device 230 is located in the trailer. In another implementation, the telematics device 230 is located in the cab 242.

Figure 2C:
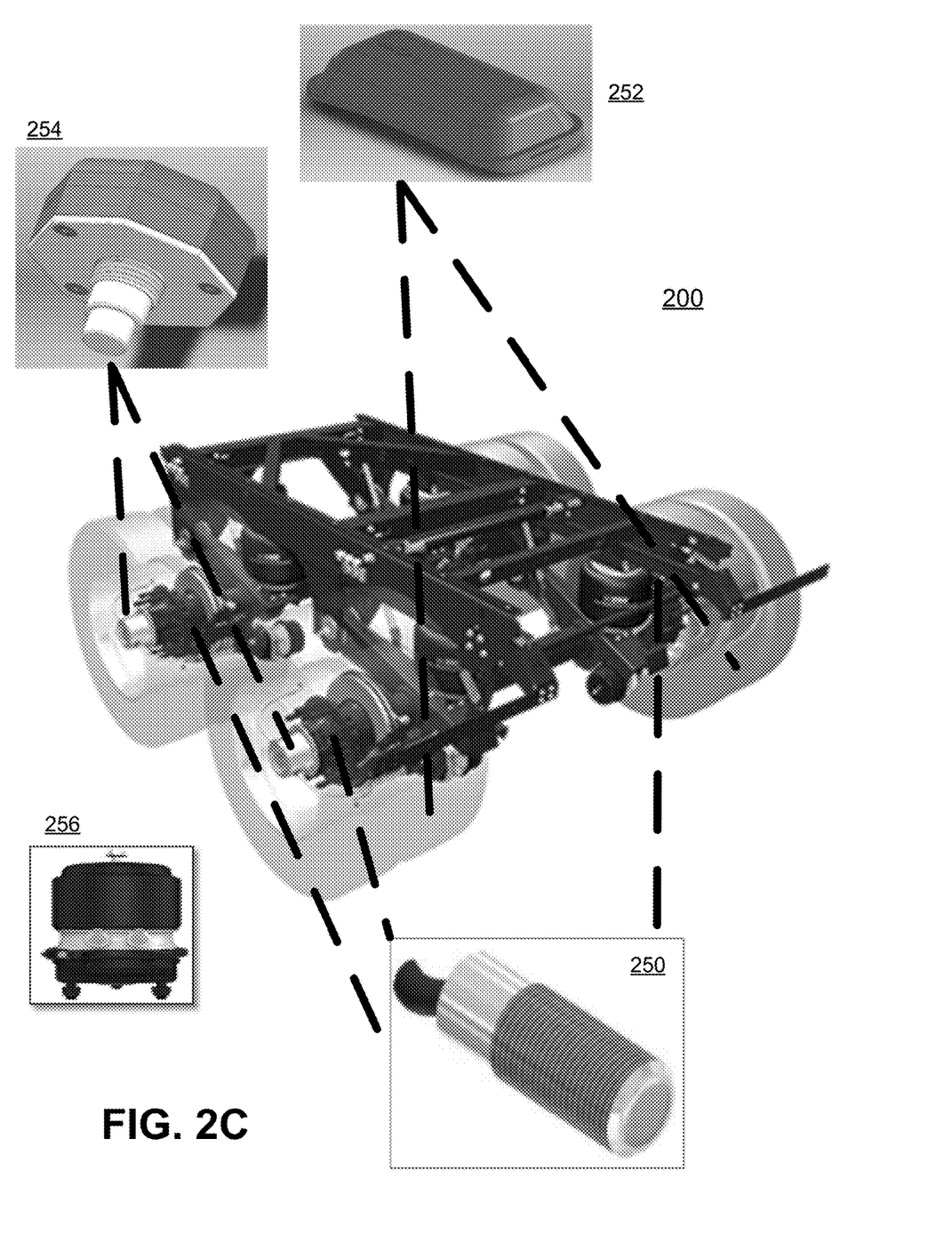
FIG. 2C shows detailed illustration of sensors of the system installed in the trailer in accordance with one implementation of the present disclosure.

FIG. 2C shows detailed illustration of sensors of the system 200 installed in the trailer in accordance with one implementation of the present disclosure. In the illustrated implementation of FIG. 2C, the sensors include a brake temperature sensor 250, a tire pressure monitoring sensor 252, a wheel end sensor 254, and an air brake chamber sensor 256. In one implementation, the brake temperature sensor 250 is installed on each brake. In another implementation, the tire pressure monitoring sensor 252 is installed in all tires. In another implementation, the wheel end sensor 254 is installed on all wheel ends. In another implementation, the air brake chamber sensor 256 is installed on all wheel ends. The air brake chamber sensor 256 is an air pressure sensor that measures air pressure on the brake chamber to determine whether the brake is engaged or disengaged. In heavy duty trucks and trailers, the brakes are operated by air pressure. Damages and/or defects on the air hose and/or the air brake system can cause the brakes to not disengage fully (referred to as brake dragging), which may cause overheating and fire. By having the air pressure monitor sensor on the air brake chamber, the brake dragging can be detected and the driver and/or the dispatcher may be alerted. Although FIG. 2C only shows the sensors 250, 252, 254, 256 installed on the brake, the tire, and the wheel end, respectively, other sensors may be installed in other critical areas.

Figure 3:
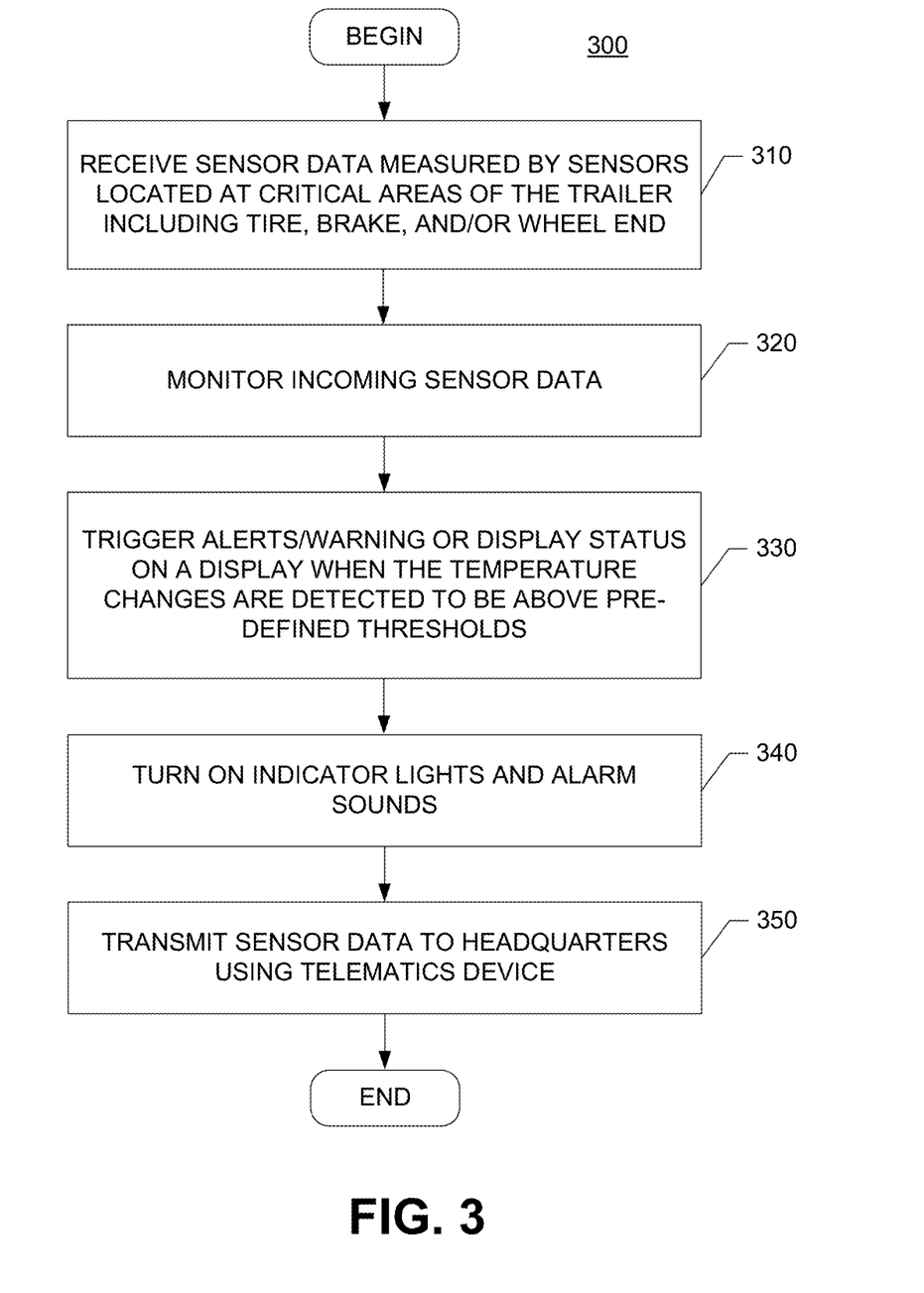
FIG. 3 is a flow diagram of a method to monitor critical areas for thermal events in accordance with one implementation of the present disclosure.

FIG. 3 is a flow diagram of a method 300 to monitor critical areas for thermal events in accordance with one implementation of the present disclosure. In the illustrated implementation of FIG. 3, the main controller receives sensor data, at step 310, measured by sensors located at critical areas of the trailer including tire, brake, and/or wheel end. The sensor data may include temperature changes. In one implementation, the sensor data is transmitted from the sensors to the main controller via wire communication. In another implementation, the sensor data is transmitted from the sensors to the main controller via wireless communication. The main controller monitors the incoming sensor data, at step 320.

In one implementation, the main controller triggers alerts and/or warnings or displays the status on a display, at step 330, when the temperature changes are detected to be above pre-defined thresholds. The main controller may also turn on, at step 340, indicator lights and/or alarm sounds to the driver. In one implementation, the main controller transmits the sensor data and the alerts/warnings to the headquarter, at step 350, using a telematics device.

In one implementation, benefits of the system and method to monitor critical areas for thermal events include the fact that: the driver can take necessary action before the events get out of control; the fleet can take necessary action to arrange for replacement parts or trailers; the total loss of the trailer and/or the cargo can be prevented, or, at least, minimized; the preventive maintenance and record keeping can be made; and the risks to other vehicles and the damages to the road and/or other properties can be prevented, or, at least, minimized.

Figure 4A:
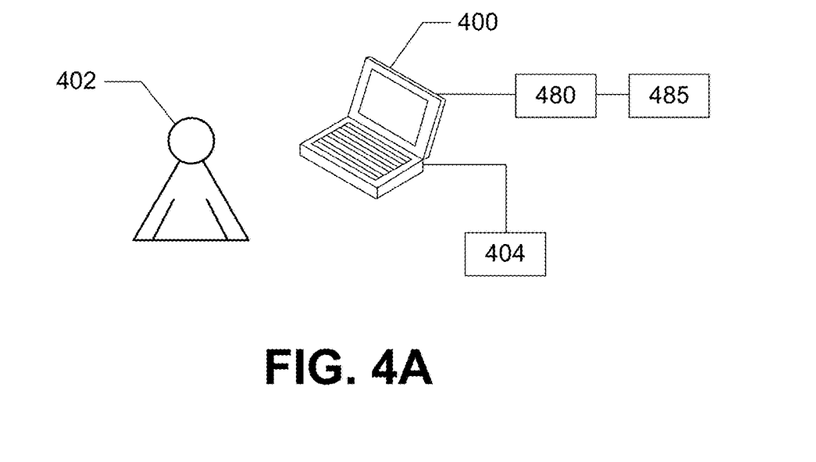
FIG. 4A is a representation of a computer system and a user in accordance with an implementation of the present disclosure.

FIG. 4A is a representation of a computer system 400 and a user 402 in accordance with an implementation of the present disclosure. The user 402 uses the computer system 400 to implement an application 490 for monitoring critical areas for thermal events as illustrated and described with respect to the system 200 in FIG. 2A and the method 300 for monitoring critical areas for thermal events in FIG. 3.

Figure 4B:
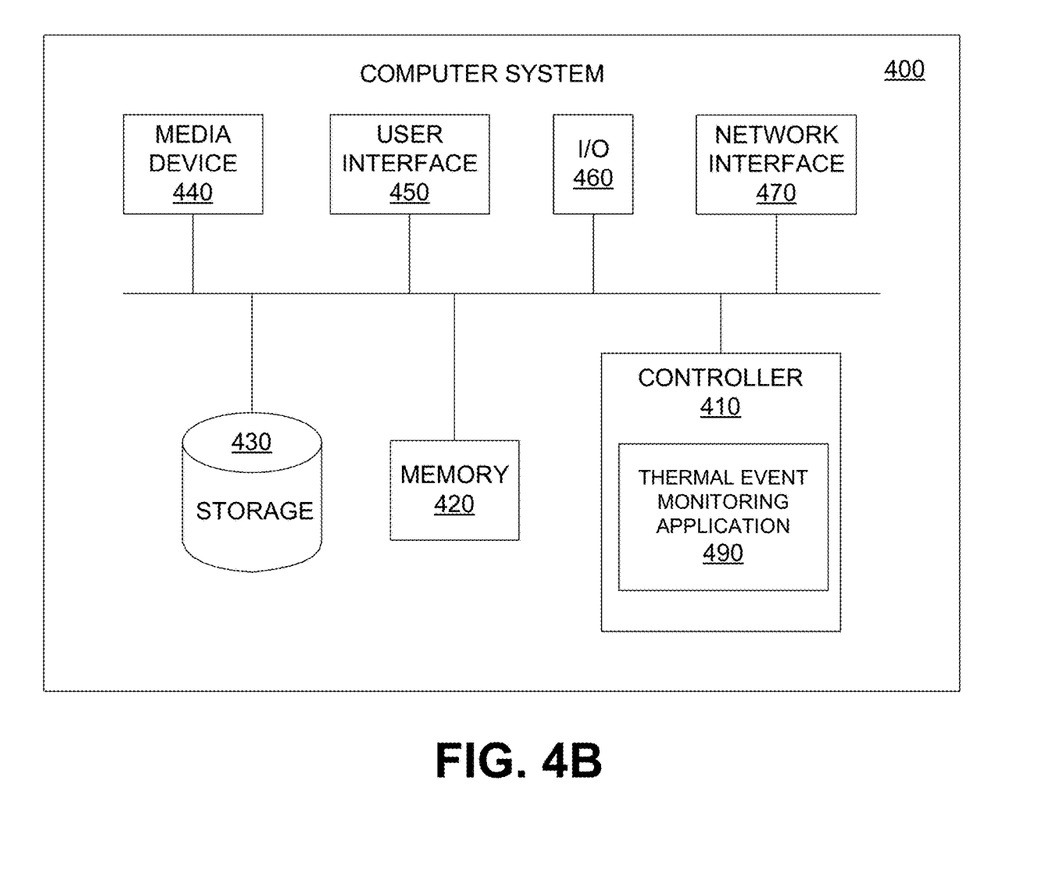
FIG. 4B is a functional block diagram illustrating the computer system hosting the thermal event monitoring application in accordance with an implementation of the present disclosure.

The computer system 400 stores and executes the thermal event monitoring application 490 of FIG. 4B. In addition, the computer system 400 may be in communication with a software program 404. Software program 404 may include the software code for the thermal event monitoring application 490. Software program 404 may be loaded on an external medium such as a CD, DVD, or a storage drive, as will be explained further below.

Furthermore, the computer system 400 may be connected to a network 480. The network 480 can be connected in various different architectures, for example, client-server architecture, a Peer-to-Peer network architecture, or other type of architectures. For example, network 480 can be in communication with a server 485 that coordinates engines and data used within the thermal event monitoring application 490. Also, the network can be different types of networks. For example, the network 480 can be the Internet, a Local Area Network or any variations of Local Area Network, a Wide Area Network, a Metropolitan Area Network, an Intranet or Extranet, or a wireless network.

FIG. 4B is a functional block diagram illustrating the computer system 400 hosting the thermal event monitoring application 490 in accordance with an implementation of the present disclosure. A controller 410 is a programmable processor and controls the operation of the computer system 400 and its components. The controller 410 loads instructions (e.g., in the form of a computer program) from the memory 420 or an embedded controller memory (not shown) and executes these instructions to control the system, such as to provide the data processing. In its execution, the controller 410 provides the thermal event monitoring application 490 with a software system, such as to monitor critical areas of a trailer for thermal events. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data either temporarily or for long periods of time for use by the other components of the computer system 400. For example, storage 430 stores data used by the thermal event monitoring application 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user 402. In one implementation, the user interface 450 includes a keyboard, a mouse, audio speakers, and a display. The controller 410 uses input from the user 402 to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for monitoring critical areas of a trailer for thermal events, the method comprising:
   receiving sensor data measured by a plurality of sensors located at the critical areas of the trailer including at least tire, brake, and wheel end;
   monitoring the sensor data for temperature changes;
   triggering alerts and warnings when the temperature changes are detected to be above pre-defined thresholds;
   turning on indicator lights and alarm sounds for a driver to halt the operation of the trailer at a site; and
   transmitting the sensor data and the alerts and warnings to a headquarter,
   wherein the headquarter receives the sensor data and delivers replacement parts to the site to minimize downtime of the trailer.

2. The method of claim 1, wherein the sensor data is received from the plurality of sensors via wireless communication.

3. The method of claim 1, further comprising displaying a status of the plurality of sensors on a display.

4. The method of claim 1, wherein the plurality of sensors includes a brake temperature sensor, a tire pressure monitoring sensor, a wheel end sensor, and an air brake chamber sensor.

* * * * *